United States Patent [19]

Kubota

[11] 4,226,631

[45] Oct. 7, 1980

[54] METHOD OF SOLIDIFYING NOXIOUS WASTES

[75] Inventor: Hirosuke Kubota, Kawanishi, Japan

[73] Assignees: Kabushiki Kaisha Takenaka Komuten, Osaka; Kabushiki Kaisha Takenaka Doboku, Tokyo, both of Japan

[21] Appl. No.: 953,383

[22] Filed: Oct. 23, 1978

[30] Foreign Application Priority Data

Oct. 26, 1977 [JP] Japan ................................. 52/129295

[51] Int. Cl.³ .............................................. C04B 7/355
[52] U.S. Cl. ........................................ 106/95; 106/97; 106/315
[58] Field of Search ................... 106/97, 98, 314, 315, 106/95, 73.6

[56] References Cited

U.S. PATENT DOCUMENTS

| | | | |
|---|---|---|---|
| 3,947,283 | 3/1976 | Uchikawa et al. | 106/315 |
| 3,947,284 | 3/1976 | Kitsugi et al. | 106/315 |
| 4,116,705 | 9/1978 | Chappell | 106/97 |

*Primary Examiner*—James Poer
*Attorney, Agent, or Firm*—Edwin E. Greigg

[57] ABSTRACT

A method of solidifying noxious wastes contaminated with toxic substances possibly affecting an environmental ecological system, using a cement-type solidifying agent and lipid added and admixed into the noxious wastes, to cause solidification thereof and at the same time fixation of the toxic contaminants, both organic and inorganic, as contained therein.

4 Claims, No Drawings

METHOD OF SOLIDIFYING NOXIOUS WASTES

BACKGROUND OF THE INVENTION

This invention relates to a technique of disposing of refuses discharged from various industries and sludge or soil settling down as sedimentation layers on the bottom of waters, in muddy, powdery or granular state which are contaminated with toxic substances possibly affecting either directly or indirectly the environmental ecological system when left without any countermeasure, (hereinafter referred to in general simply as "noxious wastes",) more particularly of solidifying them, thus at the same time confining and fixing up within the solidified mass the toxic contaminants contained in such noxious wastes and attaining the treatment of making them innoxious, eradicating the fear of causing any problem of secondary pollution, with the intention of using the wastes as civil engineering material for reclamation, filling, banking, polder, land improvement and the like or of reusing them as a material for some useful formed objects.

It is normally or often the case that the sludges settling down as sedimentation layers on the bottom of rivers, harbors, lakes or the like neighboring industrial areas, as well as the refuses in the form of sludge or the like discharged from chemical industries or generally the industries using chemicals, contain also organic chlorine, phosphorus, sulfur, nitrogen, arsenic, mercury, copper or the like compounds, in addition to inorganic toxic contaminants as heavy metal or the like compounds. Such noxious wastes harmfully affect the ecological system when left without any countermeasure, thus as a source of environmental pollution, and such countermeasure is now in urgent need to solve the grave social problem.

As a conventional countermeasure for making such noxious wastes harmless, it has commonly been practiced to admix hydraulic cement, or cement-type solidifying agent containing hydraulic cement as a main effective ingredient, to the noxious wastes in order to solidify them and to confine and fix up the toxic contaminants within the solidified mass. Such conventional method of solidification treatment using solely a cement-type solidifying agent may well confine and fix up heavy metal elements and the like all right, but there is doubt about its effectiveness upon organic toxic contaminants, leaving the fear in some instances that it results even in a contrary effect of promoting the secondary pollution by redissolution of organic toxic contaminants from such solidified mass. Reason for such tendency may be attributed to the fact that most of the organic toxic contaminants have by nature poor chemical or physical affinity for the hydration products of the cement-type solidifying agent, but the cause may in some instances be that the formation of alkaline medium in the process of an hydration of the cement-type solidifying agent contributes to the augmentation the solubility of the organic toxic contaminants in water.

SUMMARY OF THE INVENTION

The inventor has reached a finding, through his experimental studies of the method of solidifying various noxious wastes, containing also the organic contaminants such as various synthetic organic agricultural chemicals, PCB, alkyl-mercury compounds and so forth in addition to toxic heavy metal or the like contaminants, done with use of conventional hydraulic cements or various cement-type solidifying agents containing hydraulic cement (to be understood in wide meaning as including gypsum or the like) as the main effective ingredient, and of confining and fixing up the toxic contaminats within the solidified mass, that the use of small amount of a fatty oil, higher fatty acid, or else a mixture of both of them or the lipid in general including the said substances as the main constituent, (hereinafter simply referred to generally as "lipid",) together with the cement-type solidifying agents, makes it possible to very effectively confine and fix up within the solidified mass not only the heavy metal elements but also in particular the organic toxic contaminants and to block them from redissolution. It has thus been experimentally established that most of the organic toxic contaminants, whose fixation has been difficult because of their poor affinity for the hydration products of the cement-type solidifying agents, can very effectively be confined and fixed up within the matrix of the said hydration products of the cement-type solidifying agents when proper lipid having good affinity for such organic toxic contaminants is provided as the intermediary.

In general, most of the organic toxic contaminants are themselves lipophilic and have therefore the properties of being dissolved in or adsorbed by lipid, forming solvate with lipid, or being bonded to the unsaturated site of the lipid molecule thus to thereby be fixed up, and the lipid formed up in such state may then further react with calcium hydroxide which is the hydration product of the cement-type solidifying agent so as to form very stable and hydrophobic calcium soap as is sealed up in the matrix of the hydration product of the cement-type solidifying agent while functioning itself as a carrier for the organic toxic contaminants.

The object of this invention is to provide an easily and economically practicable highly practical method for very effectively fixing up the organic toxic contaminants, which fixing has particularly been difficult with use simply of the conventional hydraulic cements or cement-type solidifying agents containing hydraulic cement as the main effective ingredient.

Further objects and advantages will become clear from the description to follow:

DESCRIPTION OF THE PREFERRED EMBODIMENTS

In view of what is described hereinabove, the lipid to be used in practicing the method of this invention should be selected in good consideration of acid value, iodine value, saponification value, melting (or solidifying) point, refractive index, carbon atom number, compatibility with the organic toxic substances, and so forth, but most of the fatty oils or higher fatty acids as are in liquid state at normal temperature are practically usable.

From the economical viewpoint, however, it is preferable to use crude products, waste edible oils, or else by-products or refuses containing fatty oils or higher fatty acids as are obtained in the process of producing various oil products or of refining oils, for practicing the method of this invention, rather than to use highly refined expensive materials. Particularly useful among them is Japanese acid clay discharged as waste in oil refining process, with good amount of lipids adsorbed thereto. In such cases, this invention has particularly significant practical merits since such practicing can thus make effective reuse of the wastes or refuses as are otherwise troublesome to dispose of.

In practicing this invention, the amount of the lipid to be used should be determined considering the kinds and amount of the toxic contaminants contained in the noxious wastes, the kinds and the specific state of the lipids actually used, permissible dissolubility of the toxic contaminants from the solidified mass, and so forth, but it is generally noted that the effect of fixing up the toxic contaminants initially increases in proportion to the amount of the lipid added, then flattens at a given limit amount, and further addition of an unnecessarily large amount is undesirable because of lowering the consolidation strength of the solidified mass. Normally, the objective toxic contaminants are contained in the noxious wastes in a quite small amount, and it is sufficient to add accordingly a small amount of the lipids, such for instance that the use thereof in such a small amount ranging from 1/10,000 to 1/100 of the sludge weight is sufficient in the case of the contaminated bottom sludge dredged from sedimentation layers of bottoms of waters. In order to properly disperse such small amount of lipid in a large amount of noxious wastes, it will be practical either to emulsify beforehand the lipid to be added, by means of a surface active agent or the like, to use the lipid as dispersed (possibly also with use of surface active agent) in an aqueous suspension of bentonite or the like, or to use the small amount of lipid in a pre-mixed state, namely as admixed beforehand homogeneously with the cement-type solidifying agent. As to the order of adding the lipid and the cement-type solidifying agent into the noxious wastes, there is no imperative requisition whether to add them simultaneously or separately, but in the case where a premixture of the lipid and the cement-type solidifying agent is used after a long term of storage, it is undesirable to choose fatty oils of high acid value or higher fatty acids as the lipids actually used, since such will cause mutual reaction during the storage between the lipids and the cement-type solidifying agent, which should of course be avoided.

Solidified noxious wastes according to the method of this invention, containing organic toxic contaminants, retain the desired effect of fixing up the organic toxic contaminants for a long period of time, even though biochemical disintegration of the added and admixed lipids may normally take place comparatively easily, since the said organic toxic contaminants function to hamper the microorganisms from active proliferation. It may thus be said, though it sounds paradoxical, that the fixation effect keeps up validity so long as there exist organic toxic contaminants in the solidified mass, and it should further be noted that the lipids may ultimately react with calcium hydroxide which is the hydration product of the cement-type solidifying agent, to thereby form calcium soap which is hydrophobic and chemically very stable and more resistant to the biochemical disintegration, thus to also thereby further enhance the long term durability of the effect of fixing up the organic toxic contaminants.

As is clear from the above, the method according to this invention is very simple in that together with the cement-type solidifying agent, as has conventionally been used, additional use is made only of small amount of lipid, thus is practically feasible very easily and economically, yet it has quite remarkable merits in that it can securely confine and fix up even the organic toxic substances whose fixation has been difficult with the conventional methods, retaining as its eminent feature the fixation effect for quite a long period of time thus without causing any fear of the secondary pollution by redissolution phenomena, and so it brings forth enormous industrial advantages for the benefit of a variety of industries.

The method according to this invention further has the effect of having the added lipid react also with heavy metal elements contained in the noxious wastes to form the insoluble metal soaps and, under copresence of the cement-type solidifying agent, of confining and fixing up such elements in the matrix of the hydration product of the said agent, thus it is quite effective as the method of solidifying the noxious wastes containing both the various heavy metal elements and the organic toxic substances.

This invention is further illustrated by the typical examples which follow, but needless to say, this invention is by no means limited thereto.

EXAMPLE 1

An experiment was conducted, using two kinds of sludges, one dredged from the bottom of a harbor and the other from the bottom of a river, containing various toxic contaminants (water content and toxic contaminant contents of each of the dredged sludges being shown in Table 1, with the latter sludge, dredged from the river bottom, being artificially enriched with contaminants by adding suitable amount of Parathion and methyl-mercury compounds), to cause solidification treatments thereof using respectively the solidifying agents according to this invention and the conventional cement-type solififying agents, and ultimately to measure unconfined compressive strength of and amount of the toxic contaminants leached out from each of the solidified mass test samples. The method actually followed for causing each solidification treatment was: first taking 100 parts (the term "part" used hereafter in this specification meaning always "part by weight") of the dredged sludge, next adding and admixing thereto 0.3 parts of the lipid, then further adding 20 parts of the cement-type solidifying agent, and mixing them well. The thusly obtained admixture was then molded and cured for solidification in accordance with JIS (i.e. Japanese Industrial Standard) A 1132 prescribing the "Method of making and curing concrete specimens", and upon reaching the curing age of four weeks both tests of the unconfined compressive strength and the toxic contaminant leaching-out of the cured testing specimens were simultaneously made in accordance with JIS A 1108 prescribing the "Method of test for compressive strength of concrete" and the method amended in the meantime from the one as prescribed in Official Announcement No. 13 in 1973 of Environment Agency of Japanese Government for the "Method of testing the toxic substances contained in industrial wastes (disposed of in inland reclamation)", respectively. Tests results of this Example, for both of the two kinds of sludges, are shown en bloc in Table 1.

Table 1

| In case of harbor bottom sludge (Water content: 73%) | |
|---|---|
| Unconfined | Concentration (ppm) of the toxic contaminants in the leachate obtained from the solidified mass or Content |

Table 1-continued

| Solidifying agent actually used | | compressive strength | (ppm) of the toxic contaminants in the dredged sludge itself (marked*) | | | | | | | | |
|---|---|---|---|---|---|---|---|---|---|---|---|
| Cement-type solidifying agent | Lipid | (Kg/cm²) | PCB | Organic P | Alkyl-Hg | Total Hg | —CN | $Cr^{+6}$ | Cd | Pb | As |
| Normal portland cement | None | 2.8 | 0.035 | ND | ND | 0.012 | ND | ND | ND | 0.01 | 0.08 |
| Normal portland cement | Soybean oil | 2.2 | <0.001 | ND | ND | ND | ND | ND | ND | ND | <0.05 |
| Normal portland cement | Oleic acid | 2.4 | <0.001 | ND | ND | ND | ND | ND | ND | ND | ND |
| Normal portland cement | Waste edible oil | 2.0 | <0.001 | ND | ND | ND | ND | ND | ND | ND | <0.05 |
| Normal portland cement | Waste by-product in oiling agent production** | 2.9 | ND | ND | ND | ND | ND | ND | ND | ND | ND |
| Dredged sludge itself | | — | 224* | ND* | 0.005* | 59.1* | ND* | ND* | 16.8* | 287* | 44.5* |

In case of river bottom sludge (Water content: 68%)

| Solidifying agent actually used | | Unconfined compressive strength | Concentration (ppm) of the toxic contaminants in the leachate obtained from the solidified mass or Content (ppm) of the toxic contaminants in the dredged sludge itself (marked*) | | | | | | | | |
|---|---|---|---|---|---|---|---|---|---|---|---|
| Cement-type solidifying agent | Lipid | (Kg/cm²) | PCB | Organic P | Alkyl-Hg | Total Hg | —CN | $Cr^{+6}$ | Cd | Pb | As |
| Normal portland cement | None | 3.5 | ND | 0.2 | 0.001 | 0.009 | ND | 0.6 | ND | 0.07 | <0.05 |
| Conventional solidifying agent (A) | None | 3.8 | ND | <0.1 | <0.001 | 0.005 | ND | 0.07 | ND | 0.08 | ND |
| Conventional solidifying agent (B)*** | None | 3.0 | ND | ND | <0.001 | 0.001 | ND | ND | ND | 0.01 | ND |
| Normal portland cement | Soybean oil | 3.3 | ND | ND | ND | <0.001 | ND | <0.05 | ND | ND | ND |
| Conventional solidifying agent (A) | Soybean oil | 3.4 | ND | ND | ND | <0.001 | ND | ND | ND | ND | ND |
| Conventional solidifying agent (B)*** | Soybean oil | 2.9 | ND | ND | ND | ND | ND | ND | ND | ND | ND |
| Dredged sludge itself | | — | ND* | 10.1* | 0.8* | 198* | 0.04* | 7.7* | 10.3* | 121* | 3.8* |

(ND standing for "not detected")
*On dried sludge basis
**Waste by-product obtained in production of oiling agent for textile treatment, consisting mainly of higher fatty acids
***Prepared in accordance with Japanese Patent Application SHO. 52-59848 (corresponding to U.S. Ser. No. 909,233 filed 05/24/78), using a mixture of 83 parts of normal portland cement, 12 parts of $FeSO_4 \cdot 7H_2O$ and 5 parts of $Na_2CO_3$, together with 10 parts of Ca(OH)$_2$ From the test results shown in this Table 1, it is seen that the use of small amount of lipid together with cement-type solidifying agent of the various kinds causes slight lowering of the unconfined compressive strength of the solidified mass but enhances quite remarkably the effect of fixing up the toxic contaminants.

EXAMPLE 2

An experiment was conducted, using sludge dredged from the bottom of a river, contaminated with an organic chlorine compound pesticide scientifically named decachlorooctahydro-1,3,4-metheno-2H-cyclobuta(cd) pentalen-2-one, and having water content of 52.5%, pH of 7.3, ignition loss (for 30 minutes at 600° C.) of 10.5% and content of the said organic chlorine compound of 10.2 ppm (on dried sludge basis), to cause solidification treatments thereof using respectively the conventional cement-type solidifying agents and the solidifying agents according to this invention, and ultimately to measure the amount of the said organic chlorine compound leached out from the solidified mass, following the procedure as described in Example 1. Tests results of the present Example in summary are shown in Table 2.

Table 2

| | Concentration (ppb) of the organic chlorine compound in the leachate | |
|---|---|---|
| Kind of the cement-type solidifying agent | With use only of the cement-type solidifying agent | With use of soybean oil together with the cement-type solidifying agent |
| Normal portland cement | 24 | 1.2 |
| Portland blast-furnance cement | 19 | 1.0 |
| High-aluminous cement | 7.0 | 0.9 |
| Calcined gypsum | 5.2 | 0.6 |
| Conventional solidifying agent (A) | 28 | 1.8 |
| Conventional solidifying agent (B)*** | 0.51 | ND |

Table 2-continued

| Kind of the cement-type solidifying agent | Concentration (ppb) of the organic chlorine compound in the leachate | |
|---|---|---|
| | With use only of the cement-type solidifying agent | With use of soybean oil together with the cement-type solidifying agent |
| Conventional Solidifying agent (C) | 20 | 1.3 |

***Same as that commented for table 1 under the same mark

From the test results shown in this Table 2, it is seen that the effect of fixing up the organic chlorine compound can hardly be expected with simple use only of the cement-type solidifying agent, at least in most of the cases, in dealing with the sludge dredged from the bottom of the waters, contaminated with the organic chlorine compound, as was actually used in this Example. Reference test was also made with respect to the dredged sludge itself, thus in the unsolidified state, to measure a concentration of the said organic chlorine compound in the leachate obtained therefrom, which showed the leached-out concentration of 5.0 ppb, and the concentration as measured with respect to most of the cases with use only of cement-type solidifying agents were thus found to be higher than this value of the reference test. This may perhaps be interpreted as that most of the cement-type solidifying agents yield an alkaline medium in the process of their hydration reaction, which enhances dissolubility of the said organic chlorine compound. On the other hand, it has now been found that the concentration of the organic chlorine compound in the leachate obtained from the solidified mass upon solidification treatment with use of small amount of lipid together with the cement-type solidifying agent remarkably lowers in general, thus showing that such additional use of the lipid is quite effective in enhancing the fixing-up function.

EXAMPLE 3

An experiment was conducted, using sludge dredged from bottom of a harbor, contaminated with PCB, with the PCB concentration of 239 ppm (on dried sludge basis), water content of 78%, ignition loss (for 30 minutes at 600° C.) of 35% and pH of 7.8, to check how the effect of fixing up the PCB alters in response to variation of the condition of using the lipid in the solidifying agent according to this invention. As the cement-type solidifying agent, that referred to in Example 1 as "Conventional solidifying agent (B)" was selected and 25 parts thereof were used for 100 parts of the dredged sludge, together with the lipid which was varied with respect to kind, state, order of addition, and amount actually used. Leaching-out tests of PCB were made with respect to the solidified masses cured in the air of normal temperature and humidity, at the curing ages of two weeks and four weeks, respectively, in accordance with the method of the Announcement of Environment Agency of Japanese Government mentioned in Example 1. Test results of the present Example in summary are shown in Table 3.

Table 3

| Particulars of the lipid actually used | | | | Concentration (ppm) of PCB in the leachate | |
|---|---|---|---|---|---|
| Kind of the lipid | State of the lipid* | Net amount (part) of the lipid actually used | Order of addition** | At the curing age of two weeks | At the curing age of four weeks |
| Soybean oil | Without treatment | 0.3 | Lipid first | <0.001 | ND |
| Soybean oil | Without treatment | 0.3 | Lipid later | <0.001 | <0.001 |
| Soybean oil | Emulsion | 0.3 | Lipid first | <0.001 | ND |
| Soybean oil | Suspension | 0.3 | Lipid first | <0.001 | ND |
| Soybean oil | Pre-mixed | 0.3 | Simultaneously | <0.001 | ND |
| Peanut oil | Without treatment | 0.3 | Lipid first | <0.001 | ND |
| Sardine oil | Without treatment | 0.3 | Lipid first | ND | ND |
| Crude rice bran oil | Without treatment | 0.3 | Lipid first | ND | ND |
| Oleic acid | Without treatment | 0.3 | Lipid first | ND | ND |
| Soybean oil | Pre-mixed | 0.01 | Simultaneously | 0.005 | 0.005 |
| Soybean oil | Pre-mixed | Simultaneously | " | <0.001 | ND |
| Soybean oil | Suspension | 0.1 | Lipid first | <0.001 | <0.001 |
| Soybean oil | Suspension | 0.1 | Simultaneously | <0.001 | ND |

*Without treatment: Added without any particular treatment
Emulsion: Used as emulsion in water, with net 20% concentration of the lipid, by means of non-ionic surface active agent
Suspension: Used as suspension prepared by agitating the admixture of net 20% of the lipid, 20% of bentonite, 60% of water together with small amount of non-ionic surface active agent
Pre-mixed: Used as pre-mixed solidifying agent as prepared by admixing and dispersing the soybean oil in the cement-type solidifying agent in each set concentration
**Lipid first: Lipid was first added and admixed into the dredged sludge, and then the cement-type solidifying agent was added and admixed thereinto
Simultaneously: Either simultaneous addition and admixing of both the lipid and the cement-type solidifying agent into the dredged sludge, or addition and admixing of pre-mixed bulk of the lipid and the cement-type solidifying agent into the dredged sludge
Lipid later: Addition and admixing in the order reverse to the "Lipid first"

From the results shown in this Table 3, it is seen that effect of fixing up PCB is rather insusceptible of variations in kind of the lipid, state thereof as acutally used, and order of addition, but that it substantially lowers if the lipid is used in too small an amount beyond a certain limit. However, the said limit is quite low and it can thus be said practically that the addition of the lipid is effective even in very small amount.

This invention, with its practical merits as evidenced by the results of the Experiments described above, has the very advantageous feature of making it possible to confine and fix up not only the heavy metal elements in the noxious wastes but also even the organic toxic contaminants whose fixation was difficult with simple use only of the conventional cement-type solidifying agents, and in fact in such sufficient degree as will cause no fear of the secondary pollution by redissolution, and since most of the lipids to be used as novel feature of this invention are available easily indeed, this invention provides highly practical method as is quite easily and economically practicable, thus bringing forth enormous industrial advantages.

We claim:

1. A method of solidifying noxious wastes containing toxic contaminants, characterized by adding and admixing: a hydraulic cement or cement-type solidifying agent containing hydraulic cement as the main effective ingredient, and a lipid, simultaneously or separately into the noxious wastes, to cause solidification and at the same time fixation of said toxic contaminants.

2. The method of claim 4, wherein said lipid is selected from the group consisting of a fatty oil, a higher fatty acid, a mixture of a fatty oil and a higher fatty acid and a material which includes a fatty oil or a higher fatty acid as the main constituent.

3. The method of claim 4, wherein said lipid is selected from the group consisting of a crude edible oil, a waste edible oil and by-products or refuses containing fatty oils or higher fatty acids as are obtained in the process of producing oil products or of refining oils.

4. The method of claim 1 wherein the amount of said lipid added ranges from 0.01 to 1 parts per 100 parts by weight of said noxious wastes.

* * * * *